(12) United States Patent
Cho et al.

(10) Patent No.: US 8,945,433 B2
(45) Date of Patent: Feb. 3, 2015

(54) CONDUCTIVE AGENT, POSITIVE ELECTRODE SLURRY COMPOSITION FOR LITHIUM SECONDARY BATTERY INCLUDING THE CONDUCTIVE AGENT, AND LITHIUM SECONDARY BATTERY INCLUDING THE CONDUCTIVE AGENT

(75) Inventors: Chae-Woong Cho, Yongin-si (KR); Woon-Suk Jang, Yongin-si (KR); Bum-Jin Chang, Yongin-si (KR); Ki-Jun Kim, Yongin-si (KR); Kwi-Seok Choi, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 823 days.

(21) Appl. No.: 13/016,598

(22) Filed: Jan. 28, 2011

(65) Prior Publication Data

US 2011/0269015 A1 Nov. 3, 2011

(30) Foreign Application Priority Data

Apr. 30, 2010 (KR) .................. 10-2010-0040808

(51) Int. Cl.
*H01M 4/583* (2010.01)
*H01B 1/24* (2006.01)
*H01M 4/02* (2006.01)
*H01M 10/02* (2006.01)
*H01M 4/60* (2006.01)
*H01M 4/62* (2006.01)
*H01M 4/131* (2010.01)
(Continued)

(52) U.S. Cl.
CPC .............. *H01M 4/623* (2013.01); *H01M 4/131* (2013.01); *H01M 4/62* (2013.01); *H01M 4/624* (2013.01); *H01M 10/0525* (2013.01); *H01M 4/1391* (2013.01); *H01M 4/625* (2013.01); *Y02E 60/122* (2013.01); *H01M 4/626* (2013.01); *H01M 2004/021* (2013.01); *H01M 2004/028* (2013.01)
USPC ........... 252/511; 252/510; 429/213; 429/122; 429/218.1; 429/231.8

(58) Field of Classification Search
USPC .................................................. 252/510–514
See application file for complete search history.

(56) References Cited

U.S. PATENT DOCUMENTS 6,153,332 A 11/2000 Nishida et al.
6,656,637 B2 12/2003 Yoon et al.
(Continued)

FOREIGN PATENT DOCUMENTS

CN 101548418 A 9/2009
DE 10237870 A 3/2004
(Continued)

OTHER PUBLICATIONS

Extended European Search Report dated Dec. 3, 2013 issued by the European Patent Office in connection with European Application No. 11163921.7, in 6 pages.
(Continued)

*Primary Examiner* — Harold Pyon
*Assistant Examiner* — Katie L Hammer
(74) *Attorney, Agent, or Firm* — Knobbe Martens Olson & Bear LLP

(57) ABSTRACT

A conductive agent having a nonzero surface charge, a positive electrode slurry composition of a lithium secondary battery, including the conductive agent, and a lithium secondary battery including the conductive agent.

9 Claims, 8 Drawing Sheets

(51) Int. Cl.
H01M 10/0525 (2010.01)
H01M 4/1391 (2010.01)

(56) References Cited

U.S. PATENT DOCUMENTS

| | | | |
|---|---|---|---|
| 7,862,929 B2 | 1/2011 | Kim et al. | |
| 2004/0018430 A1 | 1/2004 | Holman et al. | |
| 2005/0258566 A1 | 11/2005 | Naarmann et al. | |
| 2006/0257738 A1* | 11/2006 | Kim et al. | 429/217 |
| 2007/0111093 A1* | 5/2007 | Kashiwagi et al. | 429/199 |
| 2010/0230641 A1 | 9/2010 | Oki et al. | |
| 2010/0233532 A1 | 9/2010 | Hirota et al. | |
| 2011/0159360 A1* | 6/2011 | Hirota et al. | 429/206 |

FOREIGN PATENT DOCUMENTS

| | | | |
|---|---|---|---|
| JP | 1997-265976 A | | 10/1997 |
| JP | 2002-083585 | | 3/2002 |
| JP | 2004-214042 | | 7/2004 |
| JP | 2006-196205 | | 7/2006 |
| JP | 2006-313662 | | 11/2006 |
| JP | 2007-087688 A | | 4/2007 |
| JP | 2007-242386 | | 9/2007 |
| JP | 2009-026744 A | | 2/2009 |
| JP | 2009026744 A | * | 2/2009 |
| JP | 2009-187700 | | 8/2009 |
| JP | 2010-61996 | | 3/2010 |
| JP | 2010-061996 A | | 3/2010 |
| JP | 2010-061997 | | 3/2010 |
| JP | 2010-097816 A | | 4/2010 |
| KR | 1998-059088 | | 10/1998 |
| KR | 10-2000-0052298 A | | 8/2000 |
| KR | 10-2003-0093166 A | | 12/2003 |
| KR | 10-2005-0087245 A | | 8/2005 |
| WO | WO 2010/013786 A1 | | 2/2010 |

OTHER PUBLICATIONS

Chinese First Office Action dated May 26, 2014 issued in connection with Chinese Patent Application No. 201110115494.4.

* cited by examiner

CONDUCTIVE AGENT, POSITIVE ELECTRODE SLURRY COMPOSITION FOR LITHIUM SECONDARY BATTERY INCLUDING THE CONDUCTIVE AGENT, AND LITHIUM SECONDARY BATTERY INCLUDING THE CONDUCTIVE AGENT

CROSS-REFERENCE TO RELATED APPLICATIONS

This application claims the benefit of Korean Patent Application No. 10-2010-0040808, filed on Apr. 30, 2010, in the Korean Intellectual Property Office, the disclosure of which is incorporated herein in its entirety by reference.

BACKGROUND

1. Field

One or more embodiments relate to a conductive agent having a nonzero surface charge, a positive electrode slurry composition of a lithium secondary battery including the conductive agent, and a lithium secondary battery including the slurry composition.

2. Description of the Related Technology

Various portable devices are used according to the development of information and communication industries, and various types of batteries are used as an energy supply source of such portable devices. As portable device technology has developed and demand for portable devices has increased, demand for secondary batteries as energy supply sources has also increased. From among second batteries, lithium second batteries having high energy density and high voltage are commercialized and widely used.

The lithium second batteries use an intercalation-deintercalation reaction of lithium ions during charging and discharging. The lithium secondary batteries include a negative electrode using graphite as a negative electrode active material, a positive electrode using lithium transition metal oxides as a positive electrode active material, a separator, and an electrolyte of an organic solvent. Recently, a tin or silicon-based complex having a larger capacity than graphite is drawing attention for use as a negative electrode active material.

SUMMARY

One or more embodiments include a conductive agent having improved dispersibility.

One or more embodiments also include a positive electrode slurry composition of a lithium secondary battery, the slurry composition including the conductive agent.

One or more embodiments include a lithium secondary battery including the conductive agent.

One or more embodiments include a lithium secondary battery having a relatively small pore size of a positive electrode.

Additional aspects will be set forth in part in the description which follows and, in part, will be apparent from the description, or may be learned by practice of the presented embodiments.

According to one or more embodiments, a conductive agent has a nonzero surface charge.

The surface charge of the conductive agent with respect to water may be from about −100 mV to about −0.1 mV or from about +0.1 mV to about +100 mV.

Particles of the conductive agent may be surface-treated by a dispersing agent containing an amine group or a fluorine group.

The particles of the conductive agent may be surface-treated by the dispersing agent, and the dispersing agent may contains an amine group and have a molecular weight from about 100 to about 100,000 g/mol.

The particles of the conductive agent may be surface-treated by the dispersing agent, and the dispersing agent may contain a fluorine group and has a molecular weight from about 100 to about 100,000 g/mol.

The particles of the conductive agent may be surface-treated by the dispersing agent, and the dispersing agent may include an alkane-based, aryl-based, or polyurethane-based main chain, contain a fluorine group or an amine group at the end of the main chain, and have a molecular weight from about 100 to about 100,000 g/mol.

The conductive agent may include a carbon-based material, metal powder, a metal fiber, or a conductive polymer.

The dispersing agent may be one selected from the group consisting of alkanes, aryls, polyvinyl pyridines, polyacrylates, glycols, polyvinylidene fluorides, polyurethanes, ketones, carbonates, benzenes, and mixtures thereof.

According to one or more embodiments, a positive electrode slurry composition of a lithium secondary battery, the positive electrode slurry composition includes a positive electrode active material, a conductive agent, a dispersing agent, and a solvent, wherein the conductive agent has a nonzero surface charge.

In some embodiments, the surface charge of the conductive agent with respect to water may be from about −100 mV to about −0.1 mV or from about +0.1 mV to about +100 mV.

In some embodiments, the particles of the conductive agent may be surface-treated by the dispersing agent, and the dispersing agent may contain an amine group or a fluorine group.

The particles of the conductive agent may be surface-treated by the dispersing agent, and the dispersing agent may contain an amine group and have a molecular weight from about 100 to about 100,000 g/mol.

In some embodiments, the particles of the conductive agent may be surface-treated by the dispersing agent, and the dispersing agent may include an alkane-based, aryl-based, or polyurethane-based main chain, contain a fluorine group or an amine group at the end of the main chain, and have a molecular weight from about 100 to about 100,000 g/mol.

The conductive agent may include a carbon-based material, metal powder, a metal fiber, or a conductive polymer.

The dispersing agent may be one selected from the group consisting of alkanes, aryls, polyvinyl pyridines, polyacrylates, glycols, polyvinylidene fluorides, polyurethanes, ketones, carbonates, benzenes, and mixtures thereof.

The positive electrode slurry composition may further include a binder, wherein the binder may be a polyvinylidene fluoride-based binder.

The solvent may dissolve the dispersing agent.

The solvent may be selected from the group consisting of N-methyl pyrrolidine, methanol, ethanol, n-propanol, isopropanol, a mixture thereof, and water.

The contents of the active material, the conductive agent, the dispersing agent, the binder, and the solvent may be respectively from about 24 wt % to about 72 wt %, from about 0.6 wt % to about 3 wt %, from about 0.05 wt % to about 0.6 wt %, from about 0.6 wt % to about 3 wt %, and from about 25 wt % to about 70 wt %, based on 100 wt % of the positive electrode slurry composition.

According to one or more embodiments, a lithium secondary battery includes the conductive agent.

According to one or more embodiments, a lithium secondary battery includes a positive electrode containing a conductive agent having a nonzero surface charge; negative electrode containing a negative electrode active material, and an electrolyte solution.

In some embodiments, the surface charge of the conductive agent with respect to water may be from about −100 mV to about −0.1 mV or from about +0.1 mV to about +100 mV.

In some embodiments, the particles of the conductive agent may be surface-treated by a dispersing agent, and the dispersing agent may contain an amine group or a fluorine group.

In some embodiments, the particles of the conductive agent may be surface-treated by the dispersing agent, and the dispersing agent may contain an amine group and have a molecular weight from about 100 to about 100,000 g/mol.

In some embodiments, the particles of the conductive agent may be surface-treated by the dispersing agent, and the dispersing agent may contain a fluorine group and have a molecular weight from about 100 to about 100,000 g/mol.

In some embodiments, the particles of the conductive agent may be surface-treated by the dispersing agent, and the dispersing agent may comprise an alkane-based, aryl-based, or polyurethane-based main chain, contain a fluorine group or an amine group at the end of the main chain, and have a molecular weight from about 100 to about 100,000 g/mol.

In some embodiments, the conductive agent may comprise a carbon-based material, metal powder, a metal fiber, or a conductive polymer.

In some embodiments, the average pore size of the positive electrode may be from about 9 nm to about 16 nm.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
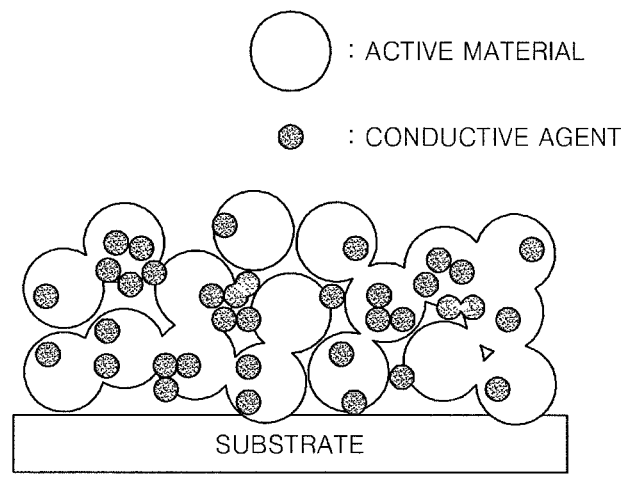
FIG. 1A is a diagram schematically illustrating a conductive agent being agglomerated when an active material and the conductive agent are mixed with each other.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

A positive electrode layer is formed of a mixture such as a positive electrode active material, a carbon conductive agent, and a binder (such as polyvinylidene fluoride (PVdF)). In order to form the positive electrode layer, a positive electrode slurry is prepared by suitably mixing and dispersing each mixture and solvent, and the positive electrode slurry is coated and dried on a current collector. Here, conductivity of the positive electrode layer is largely dependent upon uniformity of distribution of the carbon conductive agent in the positive electrode layer, and this is determined by dispersibility of the carbon conductive agent in the positive electrode slurry. Generally, a bead mill process is used to improve dispersibility of the carbon conductive agent, but such a physical approach is limited.

Embodiments will now be described more fully with reference to the accompanying drawings.

A conductive agent according to an embodiment has a nonzero surface charge, e.g., a positive or negative charge.

FIG. 1A is a diagram schematically illustrating a conductive agent being agglomerated when an active material and the conductive agent are mixed with each other.

As shown in FIG. 1A, particles of the conductive agent easily agglomerate together. Due to such an agglomeration characteristic of the conductive agent, conductivity of an electrode deteriorates, and thus characteristics of a battery are deteriorated. In embodiments, this agglomeration characteristic problem is resolved by charging surfaces of the particles of the conductive agent.

The conductive agent is used to provide conductivity to the electrode. Any electronic conducting material that does not induce a chemical change in batteries may be used. Examples of the conductive agent may include carbonaceous materials, such as natural graphite, artificial graphite, carbon black, acetylene black, ketchen black, carbon fibers, and the like; metal-based materials, such as copper (Cu), nickel (Ni), aluminum (Al), silver (Ag), and the like, in powder or fiber form; and conductive materials including conductive polymers, such as polyphenylene derivatives, and the like, or mixtures thereof.

Figure 1B:
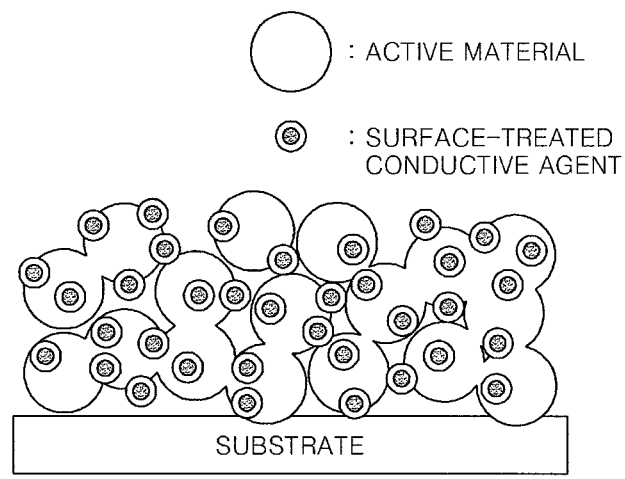
FIG. 1B is a diagram schematically illustrating a conductive agent, according to an embodiment, being dispersed when the conductive agent and an active material are mixed with each other.

FIG. 1B is a diagram schematically illustrating a conductive agent, according to an embodiment, being dispersed when the conductive agent and an active material are mixed with each other.

Referring to FIG. 1B, the conductive agent according to the current embodiment has a nonzero surface charge, e.g., a positive or negative charge, and thus particles of the conductive agent do not agglomerate together but stay apart from each other according to an electric repulsive force, thereby showing good dispersibility.

The surface of the electrode containing the conductive agent has high uniformity of a micro-structure of an electrode membrane.

When the conductive agent has a nonzero surface charge, the particles do not agglomerate together according to an electrostatic repulsive force between the particles. Here, all particles of the conductive agent have the same charge polarities. Substantially all particles of the conductive agent have either a positive (+) charge or a negative (−) charge. If some particles have a positive charge and the others have a negative charge, the particles easily agglomerate together due to electrostatic attractive force.

The conductive agent may have a surface charge from about −100 mV to about −0.1 mV or from about +0.1 mV to about +100 mV, and for example, from about −30 mV to about −0.1 mV or from about +0.1 mV to about +30 mV. The range of the surface charges is not limited.

The conductive agent may have a nonzero surface charge, e.g., a positive or negative charge by surface-treating particles of the conductive agent with a dispersing agent containing an amine group or a dispersing agent containing a fluorine group.

The dispersing agent containing the amine group may have a molecular weight from about 100 to about 100,000 g/mol. The dispersing agent containing the fluorine group may have a molecular weight from about 100 to about 100,000 g/mol.

The dispersing agent comprises, for example, an alkane-based, aryl-based, or polyurethane-based main chain, contains a fluorine group or an amine group at the end of the main chain, and may have a molecular weight from about 100 to about 100,000 g/mol. The particles of the conductive agent according to the current embodiment are surface-treated by such a dispersing agent.

The dispersing agent may be for example, but is not limited to, alkanes, aryls, polyvinyl pyridines, polyacrylates, glycols, polyvinylidene fluorides, polyurethanes, ketones, carbonates, benzenes, and mixtures thereof.

The particles of the conductive agent that are surface-treated by the dispersing agent may be checked by measuring zeta potential with respect to water, e.g., by measuring a surface charge of the particles of the conductive agent.

The particles of the conductive agent surface-treated by the dispersing agent containing the amine group have a positive surface charge, and the particles of the conductive agent surface-treated by the dispersing agent containing the fluorine group have a negative surface charge.

A positive electrode slurry composition for a lithium secondary battery, according to an embodiment, includes a positive electrode active material, a conductive agent, a dispersing agent, and a solvent, wherein the conductive agent has a nonzero surface charge.

In some embodiments, the surface charge of the conductive agent with respect to water may be from −100 mV to about −0.1 mV or from about +0.1 mV to about +100 mV.

In some embodiments, the particles of the conductive agent may be surface-treated by the dispersing agent, and the dispersing agent may contain an amine group or a fluorine group.

For example, the dispersing agent of the positive electrode slurry composition may contain an amine group and have a molecular weight from about 100 to about 100,000 g/mol, or may contain a fluorine group and have a molecular weight from about 100 to about 100,000 g/mol.

Examples of the dispersing agent include, but are not limited to, the dispersing agent having an alkane-based main chain, such as oleylamine. Alternatively, the dispersing agent may have an aryl-based main chain, such as fluorobenzene. Alternatively, the dispersing agent may have a polyurethane-based main chain. For example, the dispersing agent may have a polyurethane-based main chain, have a molecular weight from about 100 to about 100,000 g/mol, and may have an amine or fluorine group at the end of the main chain.

Examples of the conductive agent and the dispersing agent of the positive electrode slurry composition can be as described above, but are not limited thereto.

The positive electrode slurry composition may further include a binder that is generally used to prepare a positive electrode slurry composition.

The binder contained in the positive electrode slurry composition strongly binds particles of the positive electrode active material together and to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer comprising ethylene oxide, polyvinylpyrrolidone, polyurethane, polytetrafluoroethylene, polyvinylidene fluoride, polyethylene, polypropylene, styrene-butadiene rubber (SBR), acrylated SBR, and epoxy resin, and nylon. The binder may be, for example a polyvinylidene fluoride-based binder.

The solvent of the positive electrode slurry composition is not limited as long as the dispersing agent is dissolved therein. Examples of the solvent include N-methyl pyrrolidine, methanol, ethanol, n-propanol, isopropanol, a mixture thereof, and water.

Contents of the positive electrode active material, the conductive agent, the dispersing agent, the binder, and the solvent may be respectively from about 24 wt % to about 72 wt %, from about 0.6 wt % to about 3 wt %, from about 0.05 wt % to about 0.6 wt %, from about 0.6 wt % to about 3 wt %, and from about 25 wt % to about 70 wt %, based on 100 wt % of the positive electrode slurry composition.

The above contents are optimal considering the ease with which a coating process may be performed, characteristics of a prepared positive electrode, and characteristics of a prepared battery.

The conductive agent and the positive electrode slurry composition described above may be used to prepare a lithium secondary battery. For example, a positive electrode and a lithium secondary battery including the conductive agent described above may be prepared.

The conductive agent and the dispersing agent are mixed in the solvent so that a surface of the particles of the conductive agent is charged.

The conductive agent and the solvent are as described above, and the dispersing agent may contain the amine group or the fluorine group described above.

Next, the particles of the conductive agent with the charged surface, the positive electrode active material, and the binder are mixed to prepare a positive electrode active material composition. The positive electrode active material composition may be directly coated on an aluminum collector and dried to prepare a positive electrode plate. Alternatively, the positive electrode active material composition may be cast on a separate support and then a positive electrode active material film that has been peeled off from the support may be laminated on the aluminum collector to prepare a positive electrode plate.

A compound (lithiated intercalation compound), which allows reversible intercalation and deintercalation of lithium, may be used as the positive electrode active material. In particular, the positive electrode active material may be at least one composite oxide of lithium and a metal selected from the group consisting of cobalt, manganese, nickel, and a combination thereof. Examples of the positive electrode active material may include compounds represented by the following formulae.

$Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $Li_aE_{2-b}X_bO_{4-c}D_c$ (where $0 \leq b \leq 0.5$ and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.1$ and $0.001 \leq b \leq 0.1$); $Li_aCoG_bO_2$ (where $0.90 \leq a \leq 1.1$ and $0.001 \leq b \leq 0.1$); $Li_aMnG_bO_2$ (where $0.90 \leq a \leq 1.1$ and $0.001 \leq b \leq 0.1$); $Li_aMn_2G_bO_4$ (where $0.90 \leq a \leq 1.1$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof and J is selected from the group consisting of vanadium (V), chromium (Cr), manganese (Mn), cobalt (Co), nickel (Ni), copper (Co), and combinations thereof.

Particles of the compounds listed above as positive electrode active materials may have a surface coating layer (hereinafter, "coating layer"). Alternatively, a mixture of a compound having particles that do not have a coating layer and a compound having particles that have a coating layer, the compounds being selected from the compounds listed above, may be used. The coating layer may include at least one compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method, for example, a spray coating method, a dipping method, or the like, which does not adversely affect the physical properties of the positive electrode active material when a compound of such a coating element is used. This is obvious to one of ordinary skill in the art, and thus a detailed description thereof will not be provided here.

The binder is as described above.

In this regard, the contents of the positive electrode active material, the conductive agent, the binder and the solvent may be the same as described above.

A positive electrode prepared by using the positive electrode slurry composition, according to an embodiment may have an average pore size from about 9 nm to about 16 nm.

Here, the pore size of the positive electrode denotes a size of a space formed on an electrode plate as the positive electrode slurry composition is coated on the electrode plate and a volatile portion of the positive electrode slurry composition evaporates.

In a positive electrode slurry composition including an uncharged conducting material, particles of the conductive agent agglomerate together, and thus the content of a volatile portion existing between large agglomerated lumps (nonvolatile portions) is relatively large compared to the positive electrode slurry composition above. When the volatile portion evaporates during a drying process, a pore size of a prepared positive electrode is large.

However, since the conductive agent of the positive electrode slurry composition according to the embodiment may have a charge, the particles of the conductive agent is relatively well dispersed without being agglomerated, and thus the content of the volatile portion existing between the nonvolatile portions is relatively low. When the volatile portion evaporates during a drying process, a pore size of a prepared positive electrode is small.

When the positive electrode slurry composition according to the current embodiment is used, the prepared positive electrode has an average pore size of the above range.

The pore size of the positive electrode may be measured by using a general pore measuring method, and thus details thereof will not be described here.

Next, a negative electrode active material, a conductive agent, a binder, and a solvent are mixed to prepare a negative electrode active material composition. The negative electrode active material composition is directly coated on a copper current collector to prepare a negative electrode plate. Alternatively, the negative electrode material composition is cast on a separate support to form a negative electrode active material film, and then the negative electrode active material film is peeled off from the support and then laminated on the copper current collector to prepare a negative electrode plate. The contents of the negative electrode active material, the conductive agent, the binder, and the solvent are the same as those commonly used in a lithium battery.

Examples of the negative electrode active material include, but are not limited to, a lithium metal, a lithium alloy, a carbonaceous material, and graphite. The conductive agent, the binder, and the solvent in the negative electrode, active material composition may be the same as those in the positive electrode active material composition. If desired, a plasticizer may be added to the positive electrode active material composition and the negative electrode active material composition to form pores inside the electrode plates.

A suitable separator for lithium batteries may be used in forming a lithium battery. Specifically, the separator may have a low resistance to ion mobility and excellent electrolyte solution retaining properties. Examples of the separator may include glass fiber, polyester, Teflon, polyethylene, polypropylene, polytetrafluoroethylene (PTFE), and a combination thereof, each of which may be a nonwoven fabric or a woven fabric. For example, a lithium ion battery uses a winnable separator formed of polyethylene or polypropylene, and the like, and a lithium ion polymer battery uses a separator having an excellent organic electrolyte solution impregnation capability. A method of preparing these separators will now be described in detail.

A polymer resin, a filler, and a solvent are mixed to prepare a separator composition. The separator composition may be directly coated on an electrode and then dried to form a separator film. Alternatively, the separator composition may be cast on a support and then dried to form a separator composition film. The separator composition film is peeled off from the support and laminated on an electrode to form a separator film.

The polymer resin is not limited and can be any suitable material that is used as a binder of an electrode plate. Examples of the polymer resin include a vinylidenefluoride/hexafluoropropylene copolymer, polyvinylidenefluoride, polyacrylonitrile, polymethylmethacrylate, and mixtures thereof. For example, the polymer resin may be a vinylidene fluoride/hexafluoropropylene copolymer in which the content of the hexafluoropropylene is in a range of about 8 to about 25 wt %.

The separator may be interposed between the positive electrode plate and the negative electrode plate to form a battery structure. The battery structure is wound or folded and encased in a cylindrical battery case or a rectangular battery case, and an organic electrolyte solution is then injected into the battery case to complete a lithium ion battery. Alternatively, the battery structure may also be laminated to form a bi-cell structure and impregnated with an organic electrolyte solution, and the resultant structure is encased in a pouch and sealed to complete a lithium ion polymer battery.

The organic electrolyte solution may include a nonaqueous organic solvent and a lithium salt. In addition, if required, the organic electrolyte solution may further include various additives, such as an over-charge resistor.

The nonaqueous organic solvent may function as a migration medium for ions involved in electrochemical reactions in batteries.

Examples of the nonaqueous organic solvent may include carbonates, esters, ethers, alcohols, and aprotic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), and ethyl methyl carbonate (EMC). Examples of the esters available as the nonaqueous organic solvents may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, and tetrahydrofuran. An example of the ketones available as the nonaqueous organic solvent may be cyclohexanone. Examples of the alcohols available as the nonaqueous organic solvent may include ethyl alcohol, isopropyl alcohol, and the like. Examples of the a protonic solvents may include nitriles, such as R—CN (wherein R is a straight, branched or cyclic C2-C20 hydrocarbon groups, which may include a double-bonded aromatic ring or an ether bond); amides, such as dimethylformamide; dioxolanes, such as 1,3-dioxolane; and sulfolanes.

The nonaqueous organic solvent may be used alone. Alternatively, at least two of the nonaqueous organic solvents may be used in combination. In this case, a mixing ratio of the at least two of the nonaqueous organic solvents may appropriately vary according to the performance of the battery, which is obvious to one of ordinary skill in the art.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$(LiBOB; lithium bis(oxalato)borate). The concentration of the lithium salt may be in the range of about 0.1 to about 2.0 M. When the concentration of the lithium salt is within this range, the electrolyte solution may have an appropriate conductivity and viscosity, and thus may exhibit excellent performance, allowing lithium ions to effectively migrate.

Figure 2:
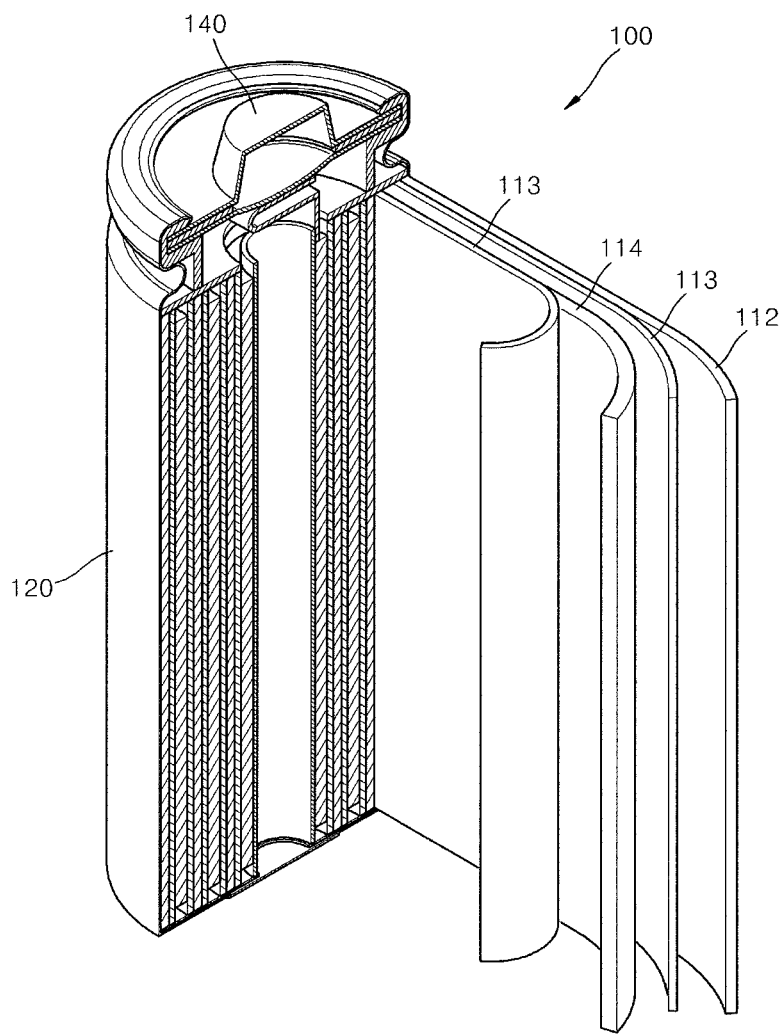
FIG. 2 is an exploded perspective view of a lithium secondary battery according to an embodiment.

FIG. 2 is a schematic view of a structure of a lithium secondary battery 100 according to an embodiment. Referring to FIG. 2, the lithium secondary battery 100 according to the present embodiment includes a positive electrode 114, a negative electrode 112, a separator 113 disposed between the positive electrode 114 and the negative electrode 112, an electrolyte solution (not shown) impregnated into the positive electrode 114, the negative electrode 112 and the separator 113, a battery case 120, and a sealing member 140 for sealing the battery case 120. The lithium secondary battery 100 is manufactured by sequentially stacking the positive electrode 114, the negative electrode 112 and the separator 113 to form a stack, winding the stack in a spiral form, and accommodating the wound stack in the battery case 120.

The present embodiments will now be described with reference to the following examples. These examples are presented for illustrative purposes only and are not intended to limit the scope of the present embodiments.

EXAMPLES

Dispersion Evaluation

Example 1

6 wt % of acetylene black used as a conductive agent, 0.6 wt % of oleylamine used as a dispersing agent, and 93.4 wt % of methylpyrrolidone used as a solvent were mixed with each other for 10 minutes at room temperature so that a surface of the conductive agent was charged.

Example 2

A surface of a conductive agent was charged in the same manner as in Example 1, except that 0.6 wt % of fluorobenzene was used as a dispersing agent.

Comparative Example 1

A surface of a conductive agent was charged in the same manner as in Example 1, except that a dispersing agent was not used.

Figure 3:
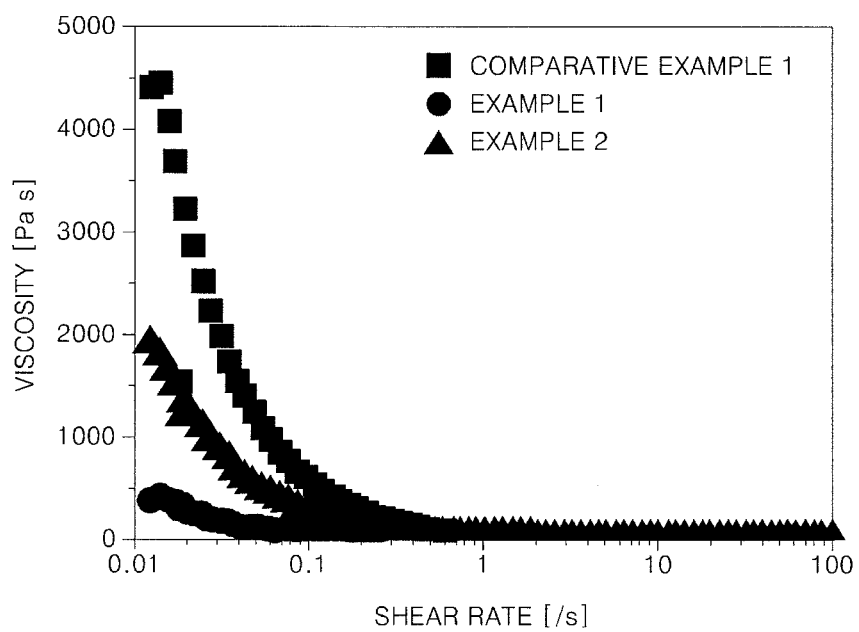
FIG. 3 is a graph comparing viscosities of mixed liquids prepared according to Examples 1 and 2, and Comparative Example 1.

Dispersibilities of the conductive agents prepared according to Examples 1 and 2 and Comparative Example 1 were compared by measuring viscosities of the conductive agents of Examples 1 and 2 and Comparative Example 1, and the results are shown in FIG. 3.

Referring to FIG. 3, the viscosities of the conductive agents of Examples 1 and 2 are lower than the viscosity of the conductive agent of Comparative Example 1, and show Newtonian flow behavior. Accordingly, it is determined that the conductive agents of Examples 1 and 2 are dispersed better than the conductive agent of Comparative Example 1.

Zeta Potential Measurement

Zeta potentials of the conductive agents of Examples 1 and 2 and Comparative Example 1 with respect to water were measured.

The zeta potential of the conductive agent of Example 1 was +23.7 mV, and the zeta potential of the conductive agent of Example 2 was −13.3 mV. The zeta potential of the conductive agent of Comparative Example 1 could not be measured since the conductive agent of Comparative Example 1 was not wetted.

Here, since the particles of the conductive agent of Example 1 is surface-treated with the dispersing agent containing the amine group, a positive charge value is measured according to the amine group existing on the surface of the particles of the conductive agent, and since the particles of the conductive agent of Example 2 is surface-treated with the dispersing agent containing the fluorine group, a negative charge value is measured according to the fluorine group existing on the surface of the conductive agent.

Dispersibility Comparison of Positive Electrode Slurry Compositions for Lithium Secondary Batteries Example 3

100 wt % of mixture was prepared by mixing 1.3 wt % of acetylene black as a conductive agent, 0.13 wt % of oleylamine as a dispersing agent, 1.3 wt % of PVdF as a binder, 63.4 wt % of NCM(Li(Ni$_{0.5}$CO$_{0.2}$Mn$_{0.3}$)O$_2$) as a positive electrode active material, and the remaining wt % of N-methylpyrrolidone as a solvent. The mixture was mixed for 10 minutes at room temperature to prepare a positive electrode slurry composition for a lithium secondary battery.

Example 4

A positive electrode slurry composition for a lithium secondary battery was prepared in the same manner as in Example 3, except that 0.13 wt % of fluorobenzene was used as a dispersing agent.

Comparative Example 2

A positive electrode slurry composition for a lithium secondary battery was prepared in the same manner as in Example 3, except that 1.3 wt % of acetylene black was used instead of a dispersing agent.

Figure 4:
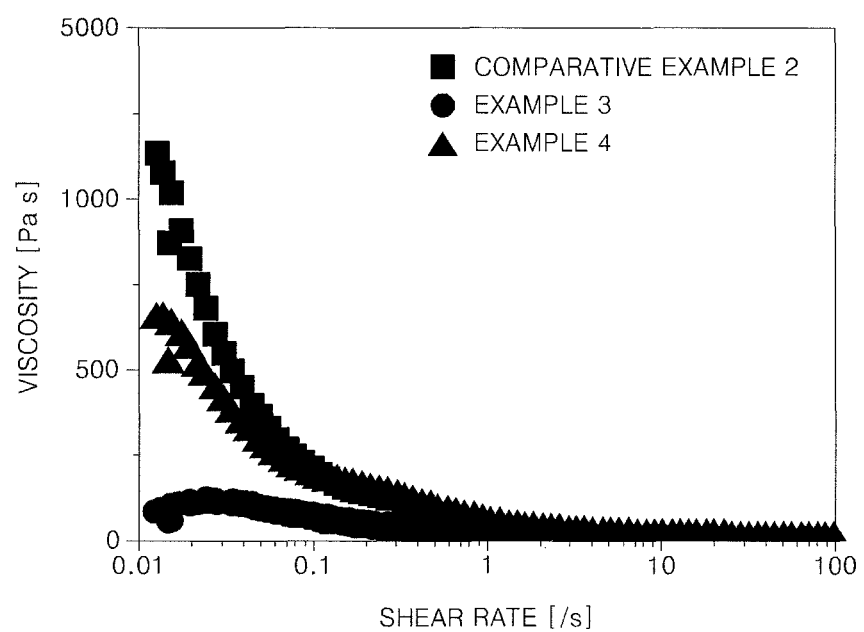
FIG. 4 is a graph comparing viscosities of positive electrode slurry compositions of a lithium secondary battery, the positive electrode slurry compositions prepared according to Examples 3 and 4, and Comparative Example 2.

Disparities of the conductive agents of Examples 3 and 4 and Comparative Example 2 were compared by measuring viscosities of the positive electrode slurry compositions of Examples 3 and 4 and Comparative Example 2, and the results are shown in FIG. 4.

Referring to FIG. 4, the viscosities of the positive electrode slurry compositions of Examples 3 and 4 are lower than the positive electrode slurry composition of Comparative Example 2, and show that it is close to Newtonian flow behavior. Accordingly, it is determined that the conductive agents of Examples 3 and 4 are better dispersed than the conductive agent of Comparative Example 2.

Preparation of Lithium Secondary Battery and Evaluation of Micro-Structure

Example 5

The positive electrode slurry composition of Example 3 was coated on an aluminum (Al)-foil to form a thin positive electrode plate having a thickness of 90 μm, dried at 135° C. for 3 hours or longer, and pressed to a thickness 70 μm. The resulting positive electrode plate was punched into a circular piece having a punching diameter of 13 φ. The circular piece was used to form a positive electrode having a shape suitable for welding. The positive electrode was welded to a bottom of a 2032 coin cell and placed in a vacuum oven that was evacuated at 250° C. for 5 hours. Next, a lithium electrode (negative electrode), a polyethylene separator having a thickness of 20 μm, and an electrolyte solution (containing a mixture of ethylene carbonate (EC) and ethylmethyl carbonate (EMC) in a volume ratio of 3:7 and 1.3M LiPF$_6$) were assembled to manufacture a lithium secondary battery.

Example 6

A lithium secondary battery was manufactured in the same manner as in Example 5, except that the positive electrode slurry composition of Example 4 was used.

Example 7

100 wt % of mixture was prepared by mixing 1.3 wt % of acetylene black as a conductive agent, 0.13 wt % of Disperbyk-2163 (manufactured by BYK Chemie GmbH (Wesel, Germany)) as a dispersing agent, 1.3 wt % of PVdF as a binder, 63.4 wt % of NCM(Li(Ni$_{0.5}$CO$_{0.2}$Mn$_{0.3}$)O$_2$) as a positive electrode active material, and a remaining wt % of N-methylpyrrolidone as a solvent. The mixture was mixed for 10 minutes at room temperature to prepare a positive electrode slurry composition for a lithium secondary battery.

A lithium secondary battery was prepared in the same manner as in Example 5, except that the positive electrode was used.

Comparative Example 3

A lithium battery was manufactured in the same manner as in Example 5, except that the positive electrode slurry composition of Comparative Example 2 was used.

Comparison Evaluation of Pore Size of Positive Electrodes

Pore sizes of the positive electrodes of the lithium secondary batteries of Example 7 and Comparative Example 3 were measured. The pore size of the positive electrode of the lithium secondary battery of Example 7 was in a range from about 9.5 nm to about 15.5 nm, and thus was 12.5 nm on average, due to the conductive agent used to prepare the positive electrode of Example 7 having good dispersibility. The pore size of the positive electrode of the lithium secondary battery of Comparative Example 3 was in a range from about 15 nm to about 28 nm, and thus was 21.5 nm on average.

Figure 5:
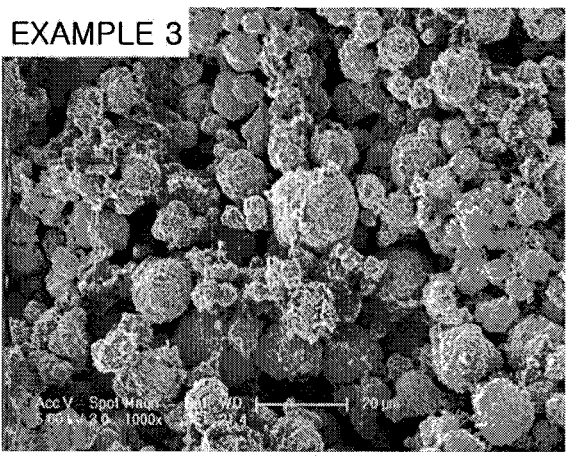
FIG. 5 is a scanning electron microscopic (SEM) photographic image of a positive electrode fabricated using the positive electrode slurry composition of Example 3.

FIG. 5 is a scanning electron microscopic (SEM) photographic image of a positive electrode fabricated using the positive electrode slurry composition of Example 3.

Figure 6:
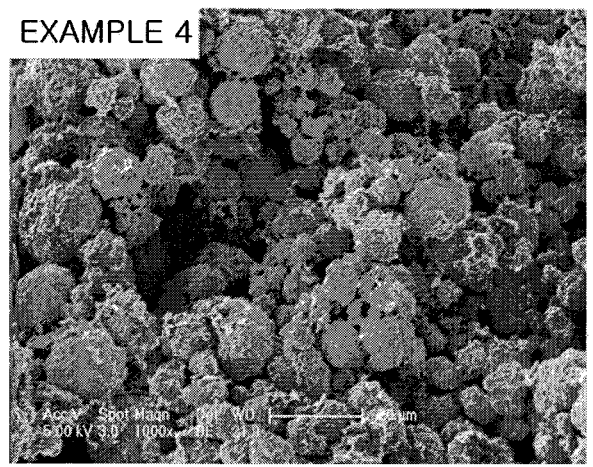
FIG. 6 is a SEM photographic image of a positive electrode fabricated using the positive electrode slurry composition of Example 4.

FIG. 6 is a SEM photographic image of a positive electrode fabricated using the positive electrode slurry composition of Example 4.

Figure 7:
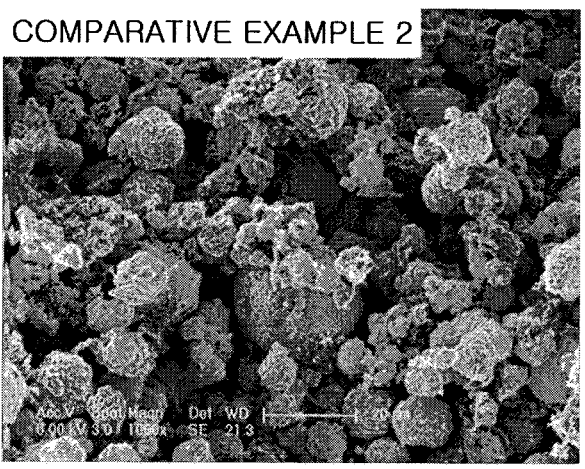
FIG. 7 is a SEM photographic image of a positive electrode fabricated using the positive electrode slurry composition of Comparative Example 2.

FIG. 7 is a SEM photographic image of an positive electrode fabricated using the positive electrode slurry composition of Comparative Example 2;

Referring to FIGS. 5, 6, and 7, the particles of the conductive agent of FIG. 7 are agglomerated together and randomly dispersed, whereas the particles of the conductive agents of FIGS. 5 and 6 are dispersed and uniformly distributed overall.

Figure 8:
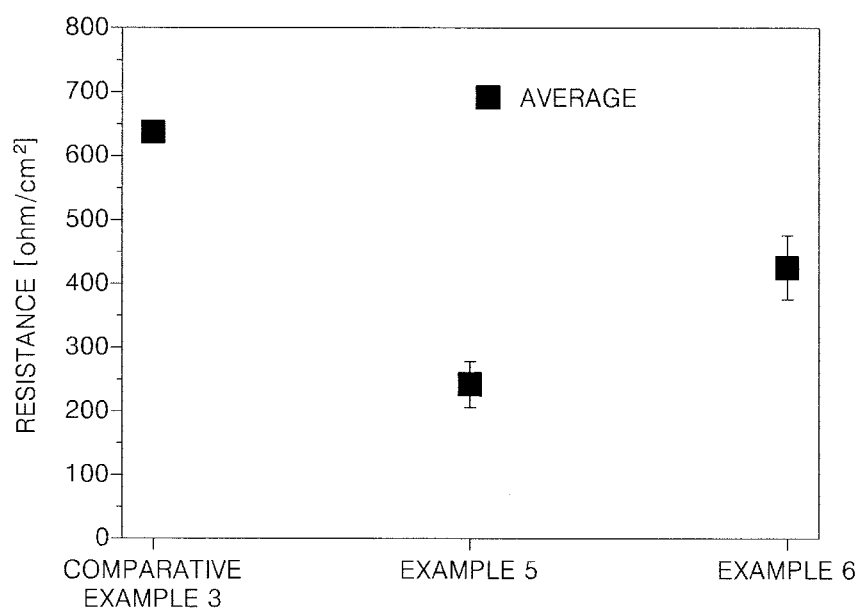
FIG. 8 is a graph comparing electrode surface resistances, e.g., surface resistances of each positive electrode of lithium secondary batteries prepared according to Comparative Example 3 and Examples 5 and 6, by preparing the positive electrodes using the positive electrode slurry compositions of Comparative Example 2 and Examples 3 and 4, according to a 4-point probe method.

FIG. 8 is a graph for comparing electrode surface resistances, e.g., surface resistances of each positive electrode of the lithium secondary batteries prepared according to Comparative Example 3 and Examples 5 and 6, by preparing the positive electrodes using the positive electrode slurry compositions of Comparative Example 2 and Examples 3 and 4, according to a 4-point probe method.

Referring to FIG. 8, when the positive electrodes are prepared by using the positive electrode slurry compositions of Examples 3 and 4, the electrode surface resistances were respectively 243 $\Omega/cm^2$ and 425 $\Omega/cm^2$, which are remarkably low compared to the electrode surface resistance of the positive electrode prepared by using the positive electrode slurry composition of Comparative Example 2, e.g., 638 $\Omega/cm^2$.

Cell resistances of the lithium secondary batteries of Comparative Example 3 and Examples 5 and 6 are shown in Table 1 below.

TABLE 1

|  | Comparative Example 3 | Example 5 | Example 6 |
|---|---|---|---|
| Cell Resistance[mΩ] | 31.9 | 29.3 | 26.8 |

Referring to Table 1, it is determined that the lithium secondary batteries of Examples 5 and 6 have lower cell resistances than the lithium secondary battery of Comparative Example 3. Such a result corresponds to a decrease in electrode resistance according to an increase in dispersibility of a conductive agent.

Figure 9:
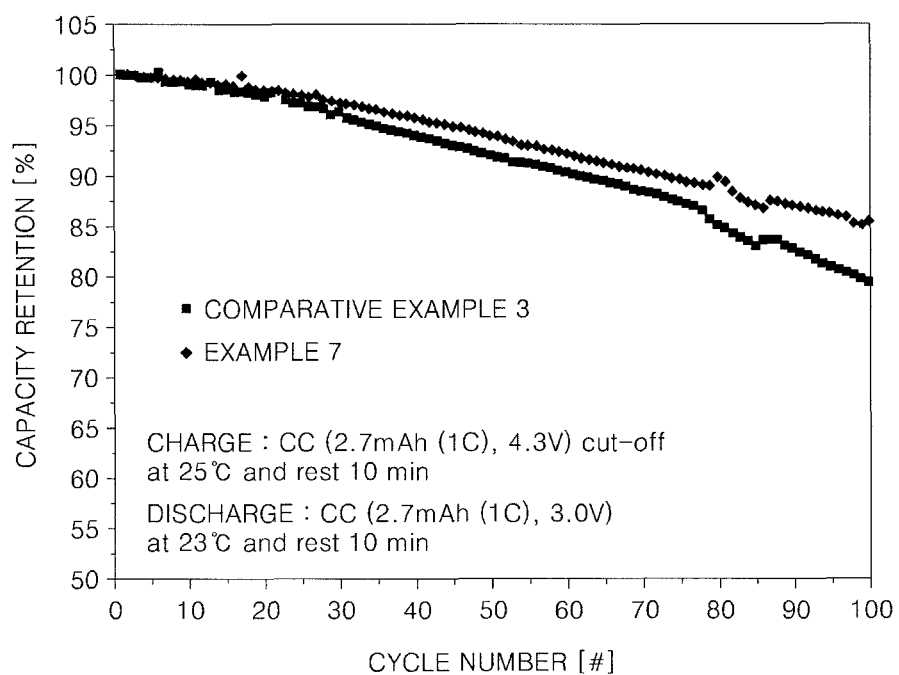
FIG. 9 is a graph comparing cell lifetimes of the lithium secondary batteries of Comparative Example 3 and Example 7.

FIG. 9 is a graph for comparing cell lifetimes of the lithium secondary batteries of Comparative Example 3 and Example 7.

Referring to FIG. 9, the cell lifetime of the lithium secondary battery of Example 7 is longer than the cell lifetime of the lithium secondary battery of Comparative Example 3.

As described above, according to one or more of the above embodiments, the dispersibility of the positive electrode slurry composition for the lithium secondary battery is increased by using the conductive agent, and when the positive electrode slurry composition is used, the surface of the electrode containing the conductive agent has high uniformity of a micro-structure of an electrode membrane and thus the prepared positive electrode has high conductivity as well as high stability.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A positive electrode slurry composition comprising:
   a positive electrode active material, a conductive agent, a dispersing agent, and a solvent, wherein the conductive agent has a nonzero surface charge;
   wherein the particles of the conductive agent are surface-treated by the dispersing agent, and the dispersing agent contains an aryl-based main chain containing a fluorine group at the end of the main chain, and has a molecular weight from about 100 to about 100,000 g/mol.

2. The positive electrode slurry composition of claim 1, wherein the surface charge of the conductive agent with respect to water is from about −100 mV to about −0.1 mV or from about +0.1 mV to about +100 mV.

3. The positive electrode slurry composition of claim 1, wherein the conductive agent comprises a carbon-based material, metal powder, a metal fiber, or a conductive polymer.

4. The positive electrode slurry composition of claim 1, further comprising a binder, wherein the binder is a polyvinylidene fluoride-based binder.

5. The positive electrode slurry composition of claim 4, wherein the contents of the positive electrode active material, the conductive agent, the dispersing agent, the binder, and the solvent are respectively from about 24 wt % to about 72 wt %, from about 0.6 wt % to about 3 wt %, from about 0.05 wt % to about 0.6 wt %, from about 0.6 wt % to about 3 wt %, and from about 25 wt % to about 70 wt %, based on 100 wt % of the positive electrode slurry composition.

6. A lithium secondary battery comprising:
   a positive electrode containing the positive electrode slurry composition of claim 1;
   a negative electrode containing a negative electrode active material; and
   an electrolyte solution.

7. The lithium secondary battery of claim 6, wherein the surface charge of the conductive agent with respect to water is from about −100 mV to about −0.1 mV or from about +0.1 mV to about +100 mV.

8. The lithium secondary battery of claim 6, wherein the conductive agent comprises a carbon-based material, metal powder, a metal fiber, or a conductive polymer.

9. The lithium secondary battery of claim 6, wherein the average pore size of the positive electrode is from about 9 nm to about 16 nm.

\* \* \* \* \*